(12) United States Patent
Wegener

(10) Patent No.: US 8,613,457 B2
(45) Date of Patent: Dec. 24, 2013

(54) SCOOTER ASSEMBLIES AND SCOOTER DECK ASSEMBLIES

(76) Inventor: Andreas C. Wegener, Encinitas, CA (US)

(*) Notice: Subject to any disclaimer, the term of this patent is extended or adjusted under 35 U.S.C. 154(b) by 302 days.

(21) Appl. No.: 13/045,861

(22) Filed: Mar. 11, 2011

(65) Prior Publication Data

US 2012/0228845 A1 Sep. 13, 2012

(51) Int. Cl.
*B62M 1/00* (2010.01)
(52) U.S. Cl.
USPC .............. 280/87.041; 280/87.01; 280/87.021
(58) Field of Classification Search
USPC ............................ 280/87.041, 87.01, 87.021
See application file for complete search history.

(56) References Cited

U.S. PATENT DOCUMENTS

| | | | | |
|---|---|---|---|---|
| 3,990,713 A | | 11/1976 | Hokanson | |
| 4,161,326 A | * | 7/1979 | Gaber | 280/87.042 |
| 4,911,457 A | * | 3/1990 | Ishikawa | 280/240 |
| 5,267,743 A | * | 12/1993 | Smisek | 280/87.042 |
| 5,927,733 A | * | 7/1999 | Banda | 280/87.041 |
| 6,173,976 B1 | * | 1/2001 | Lee | 280/87.041 |
| 6,234,501 B1 | * | 5/2001 | Chen | 280/87.041 |
| 6,244,605 B1 | * | 6/2001 | Liu | 280/87.041 |
| 6,260,866 B1 | * | 7/2001 | Cheng | 280/87.041 |
| 6,279,929 B1 | * | 8/2001 | Fruechtenicht | 280/87.041 |
| 6,305,869 B1 | * | 10/2001 | Chen | 280/87.041 |
| 6,322,092 B1 | * | 11/2001 | Chen | 280/279 |
| 6,367,829 B1 | * | 4/2002 | Lee | 280/87.05 |
| 6,378,880 B1 | * | 4/2002 | Lin | 280/87.05 |
| 6,485,039 B1 | * | 11/2002 | Ming-Fu | 280/87.041 |
| 7,007,977 B1 | * | 3/2006 | Gallagher | 280/87.042 |
| 7,226,081 B2 | * | 6/2007 | Chen | 280/87.041 |
| 7,954,831 B1 | * | 6/2011 | Yeh | 280/87.042 |
| 2002/0030339 A1 | * | 3/2002 | Powers | 280/87.041 |
| 2002/0093167 A1 | | 7/2002 | Jones et al. | |
| 2002/0108798 A1 | | 8/2002 | Huntsberger et al. | |
| 2002/0167142 A1 | * | 11/2002 | Chen | 280/87.041 |
| 2002/0180169 A1 | * | 12/2002 | Kwok | 280/87.041 |
| 2005/0001399 A1 | * | 1/2005 | Yeo et al. | 280/87.041 |
| 2005/0230931 A1 | | 10/2005 | Chen | |
| 2005/0248112 A1 | * | 11/2005 | Iavarone et al. | 280/87.041 |

FOREIGN PATENT DOCUMENTS

DE 10 2004 029 961 A1 1/2006
EP 2174860 A1 4/2010

* cited by examiner

*Primary Examiner* — J. Allen Shriver, II
*Assistant Examiner* — James M Dolak
(74) *Attorney, Agent, or Firm* — Eric L. Lane; McKenna Long & Aldridge LLP

(57) ABSTRACT

A deck assembly for a scooter comprises a deck having a top surface, a bottom surface, and two side surfaces, and a grind plate having a front end, a rear end, a mating surface, and a grinding surface. The grind plate may be slidably attachable to the deck such that the mating surface of the grind plate mates with the bottom surface of the deck, and the bottom surface of the deck and at least a portion of each side surface of the deck are covered by the grind plate. A scooter assembly may further comprise a neck, a handlebar assembly, and steer tube extending through a down tube. The steer tube may be a butted tube member having a first wall thickness near a bottom portion of the butted tube member and a second wall thickness near a top portion of the butted tube member, the first wall thickness being greater than the second wall thickness. The steer tube may define a linear slot at or near the bottom portion of the steer tube and a key adapted to fit into the linear slot.

18 Claims, 9 Drawing Sheets

SCOOTER ASSEMBLIES AND SCOOTER DECK ASSEMBLIES

FIELD

The present disclosure relates to scooter assemblies and scooter deck assemblies.

BACKGROUND

Freestyle scootering is an increasingly popular action sport. There are several freestyle scooter competitions and exhibitions held annually in which participants engage in stylized riding and a variety of tricks. In addition, riders use scooters for exercise and recreation in parks, city streets, sidewalks, driveways, and parking lots. Some of this activity includes use of different structures such as stairs, curbs, ledges, handrails, speedbumps, and gaps.

These activities cause wear and tear on the scooters and often result in cracked or broken scooters. One particularly common problem is cracking of the scooter deck. Traditional scooter decks are made of metal, often aluminum, which wears down quickly and needs to be replaced frequency. Metal decks also have disadvantages for popular riding activities such as grinding. In particular, grinding on steel rails with a metal deck causes the scooter to move too fast and compromises the rider's control of the scooter, while grinding on concrete curbs or ledges slows down the scooter and damages the deck.

An existing solution for protecting the deck of the scooter is a deck saver. Currently, deck savers are substantially flat metal plates that bolt onto the bottom of the scooter deck. However, existing deck savers have significant disadvantages. Because they typically have at least four bolt and locknut attachment assemblies, they can be tedious and time consuming to attach to the scooter deck. Furthermore, they typically are not structured to protect the side surfaces of the scooter deck, and the use of metal for the deck saver may hinder performance of grinding tricks by the user.

Another problem is that scooters often break at the point of attachment of the down tube to the deck due to the significant stresses put on this connection point. This problem is typically addressed by increasing the wall thickness of the steer tube or the handlebars. However, this adds significant weight to the scooter, making it more difficult to maneuver. Another major problem with existing scooters is that over time significant play can develop in the handlebar assembly or the steer tube such that the handlebars go out of alignment with the front wheel.

Accordingly, there is a need for a scooter deck assembly that includes a deck saver component that is easy to attach and facilitates popular activities and tricks such as grinding while protecting the bottom and sides of the scooter deck. There also is a need for a scooter with a more secure connection of the deck and down tube without adding significant weight to the scooter. Finally, a need exists for a solution to maintain the alignment of the handlebar assembly and the front wheel of the scooter.

SUMMARY

The present disclosure, in its many embodiments, alleviates to a great extent the disadvantages of known scooters by providing a deck assembly for a scooter that includes a grind plate that is slidably attachable to the deck so that the bottom surface of the deck and a portion of the side surfaces of the deck are protected from damage. In addition, a butted steer tube and a neck having cross beams provide additional strength for the scooter with little added weight. A slot and key feature provides consistent alignment of the front wheel, steer tube and handlebars.

Exemplary embodiments of a deck assembly for a scooter comprise a deck having a top surface, a bottom surface, and two side surfaces, and a grind plate having a front end, a rear end, a mating surface, and a grinding surface. The grind plate may be slidably attachable to the deck such that the mating surface of the grind plate mates with the bottom surface of the deck, and the bottom surface of the deck and at least a portion of each side surface of the deck are covered by the grind plate. In exemplary embodiments, the grind plate and the deck comprise interlocking dovetail slide-in features. The grind plate may be made of plastic, and the grinding surface of the grind plate may be substantially V-shaped. The deck may define a storage compartment therein.

In exemplary embodiments, a scooter assembly is provided comprising a deck having a front end, a rear end, a top surface, a bottom surface, and two side surfaces, and a neck joined to the deck at or near the front end of the deck. The neck may comprise one or more cross beams. A head tube may be fixedly attached to the neck, and a steer tube may extend through the head tube. In exemplary embodiments, the steer tube is a butted tube member having a first wall thickness near a bottom portion of the steer tube and a second wall thickness near a top portion of the steer tube, the first wall thickness being greater than the second wall thickness. The front fork may define a linear slot, and a key may be provided that fits into the linear slot.

The scooter assembly may further comprise a clamp assembly coupled to the steer tube at or near the bottom portion of the steer tube. A handlebar assembly is attached to the steer tube at or near a top portion of the steer tube. A front fork may be movably coupled to a bottom portion of the steer tube and a front wheel is coupled to the front fork, and a fixed position rear wheel may be coupled to the deck at or near the rear end of the deck. In exemplary embodiments, the scooter assembly further comprises a grind plate having a front end, a rear end, a mating surface, and a grinding surface. The grind plate is slidably attachable to the deck such that the mating surface of the grind plate mates with the bottom surface of the deck, and the bottom surface of the deck and at least a portion of each side surface of the deck are covered by the grind plate.

Exemplary embodiments of a scooter assembly comprise a deck having a front end, a rear end, a top surface, a bottom surface, and two side surfaces, and a neck joined to the deck at or near the front end of the deck. The neck may comprise one or more cross beams. A head tube is fixedly attached to the neck, and a steer tube may extend through the head tube. A front fork is movably coupled to a bottom portion of the steer tube, and a front wheel is coupled to the front fork. A fixed position rear wheel is coupled to the rear end of the deck. The scooter assembly further comprises a handlebar assembly attached to the steer tube at or near a top portion of the steer tube.

In exemplary embodiments, the front fork defines a linear slot, and the scooter assembly further comprises a key adapted to fit into the linear slot. A clamp assembly may be coupled to the steer tube at or near the bottom portion of the steer tube and cover the linear slot and key. The steer tube may be a butted tube member having a first wall thickness near a bottom portion of the steer tube and a second wall thickness near a top portion of the steer tube, the first wall thickness being greater than the second wall thickness.

In exemplary embodiments, the scooter assembly further comprises a grind plate having a front end, a rear end, a mating surface, and a grinding surface. The grind plate may be slidably attachable to the deck such that the mating surface of the grind plate mates with the bottom surface of the deck, and the bottom surface of the deck and at least a portion of each side surface of the deck are covered by the grind plate. In exemplary embodiments, the grind plate and the deck comprise interlocking dovetail slide-in features, and the grinding surface of the grind plate is substantially V-shaped.

Accordingly, it is seen that scooter assemblies are provided which protect the bottom and sides of the scooter deck, prevent misalignment problems, and provide strong, but lightweight scooters. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
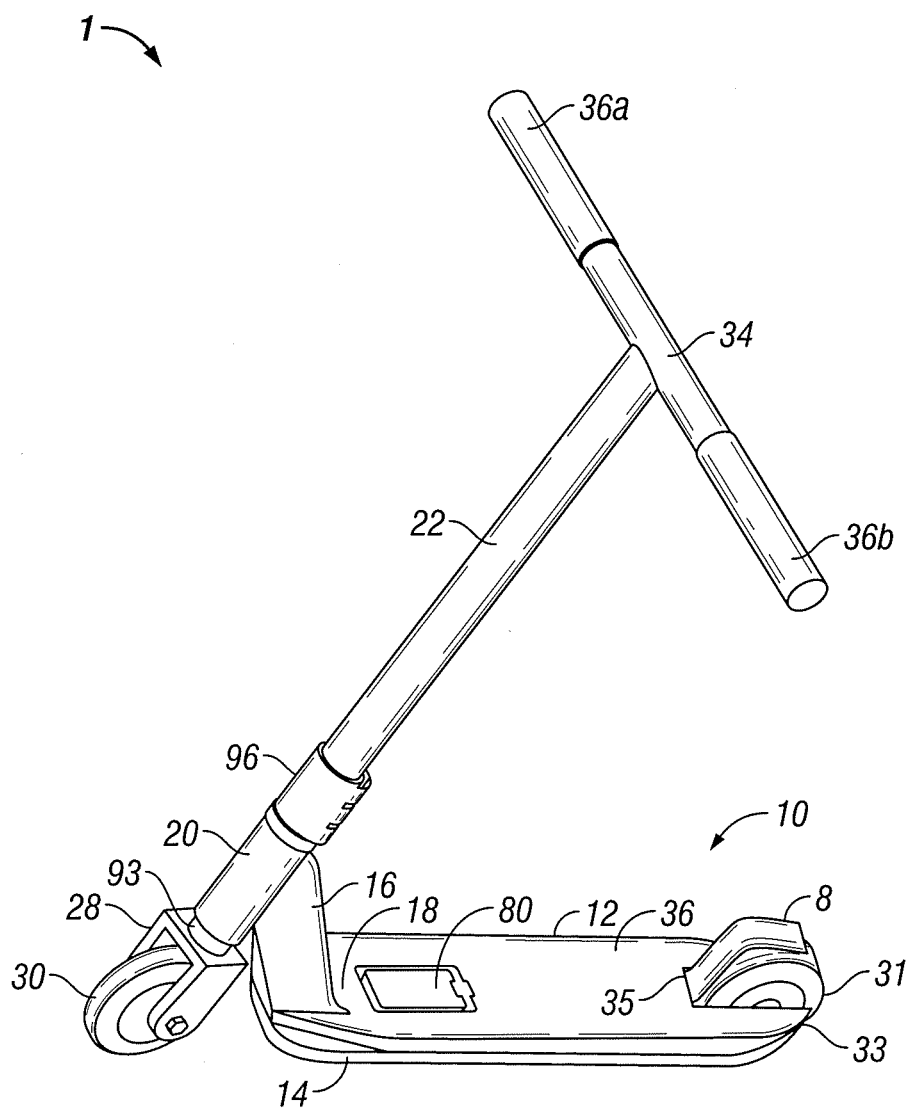
FIG. 1 is a perspective view of an embodiment of a scooter assembly in accordance with the present disclosure.
Figure 2:
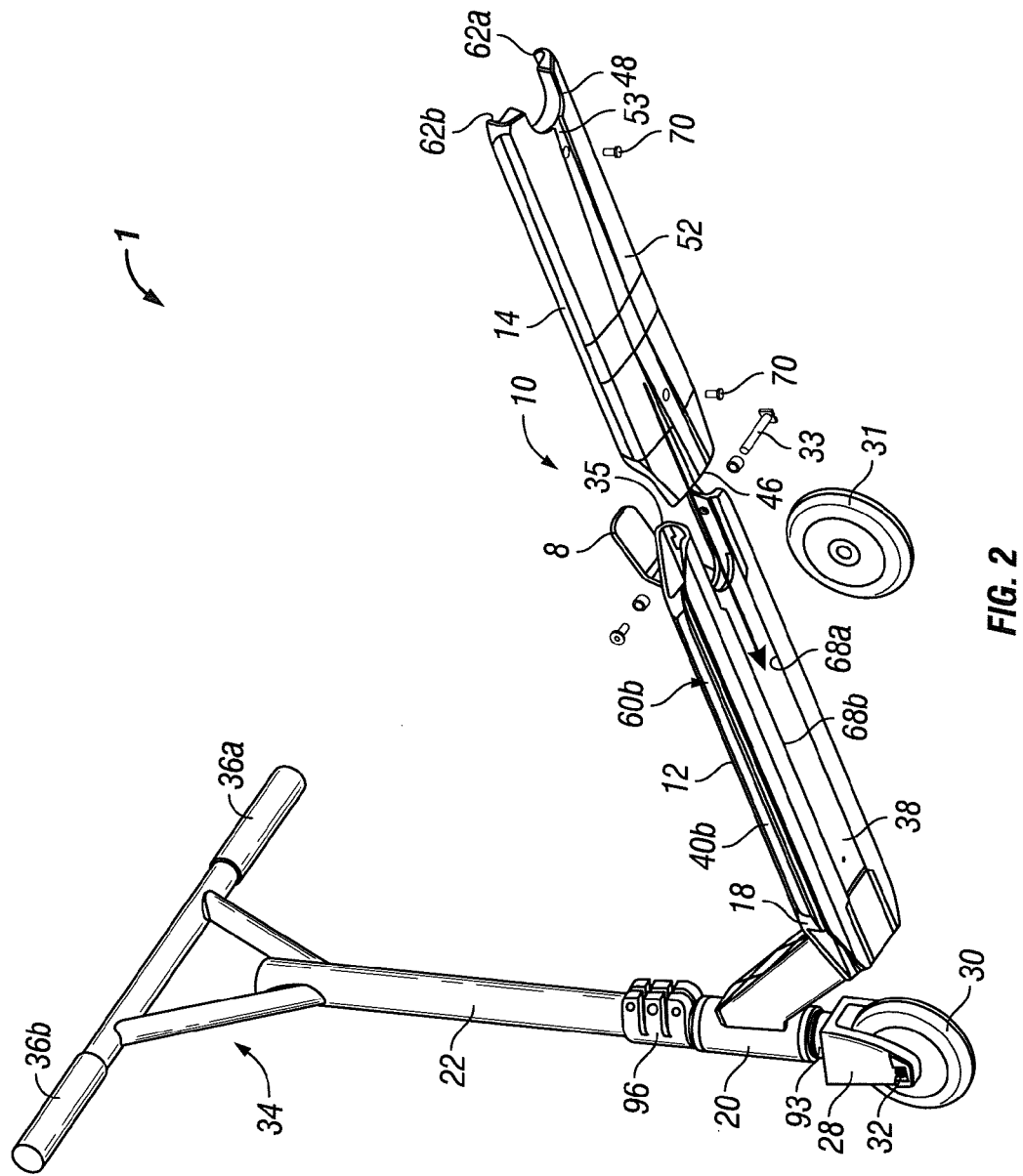
FIG. 2 is a perspective view of an embodiment of a scooter assembly in accordance with the present disclosure.

FIGS. 1 and 2 show an exemplary embodiment of a scooter assembly 1 that includes a deck assembly 10 comprised of deck 12 and, optionally, grind plate 14. Neck 16 is joined to deck 12 at or near a front end 18 of the deck 12. A head tube 20 is fixedly attached to the neck 16, which serves to operatively connect the deck 12 to the front wheel and the handlebar assemblies. The neck 16 may be integrally formed with the deck 12 such that the deck 12 and neck 16 are a single machined component. Alternatively, the neck 16 and head tube 20 may be integrally formed as a single component. The neck 16 and head tube 20 may be made of various metals, plastic, carbon fiber, or other materials that impart sufficient structural strength but are not so heavy that they compromise maneuverability of the scooter. Steer tube 22 has a top portion 24 and a bottom portion 26 and extends through the head tube 20. Front fork 28 is movably coupled to the bottom portion 26 of the steer tube 22 and has a front wheel 30 coupled thereto via front wheel axle 32. At the top portion 24 of the front fork 28 a handlebar assembly 34 is attached, providing handles 36a, 36b for the rider to grip and steer the scooter. Turning the handlebar assembly 34 causes steer tube 22 to turn the front fork 28 and front wheel 30. A brake 8 may be fixedly attached to or integrally formed with a rear end 35 of deck 12, which also has a rear wheel 31 coupled thereto via a rear wheel axle 33. The rear wheel 31 may be turnable or a fixed position wheel.

Figure 5:
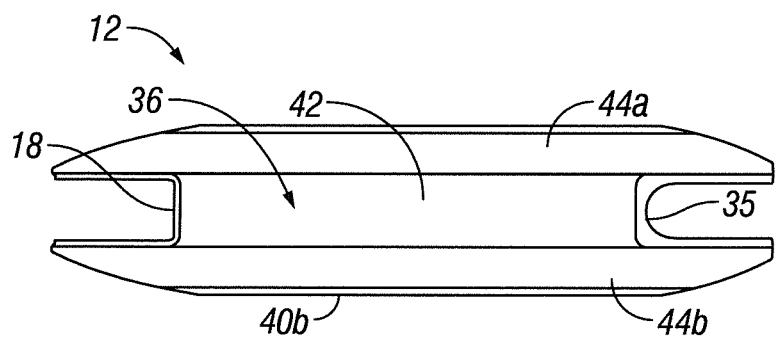
FIG. 5 is a top view of an embodiment of a deck in accordance with the present disclosure.
Figure 6:
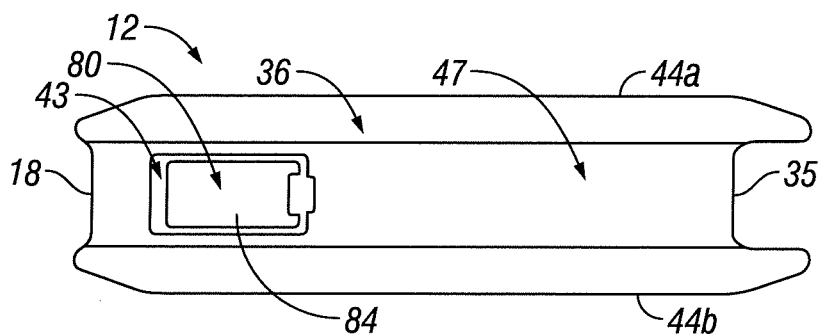
FIG. 6 is a top view of an embodiment of a deck in accordance with the present disclosure
Figure 7A:
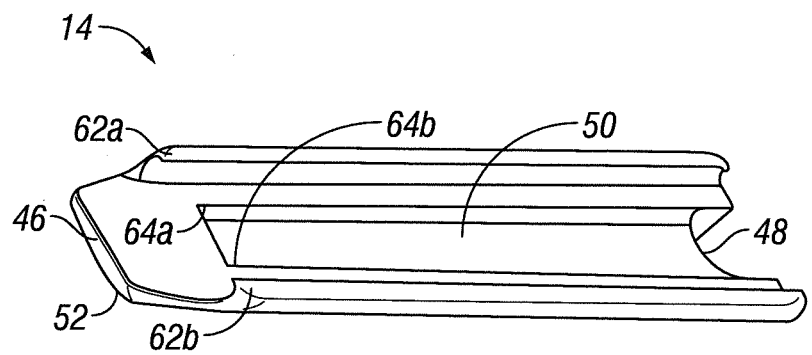
FIG. 7A is a perspective view of an embodiment of a grind plate in accordance with the present disclosure.
Figure 7B:
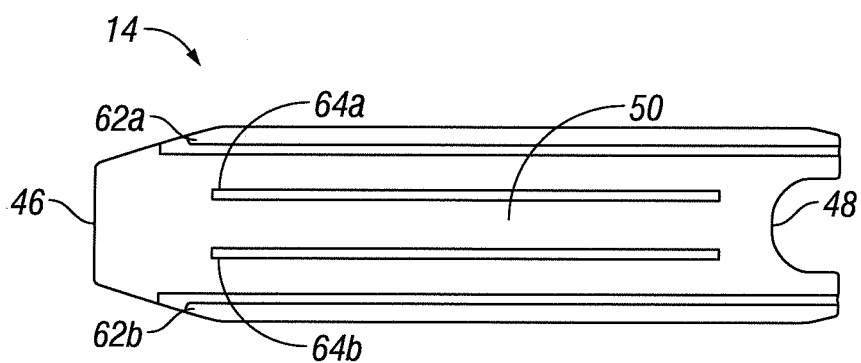
FIG. 7B is a top view of the grind plate of FIG. 7A.
Figure 8:
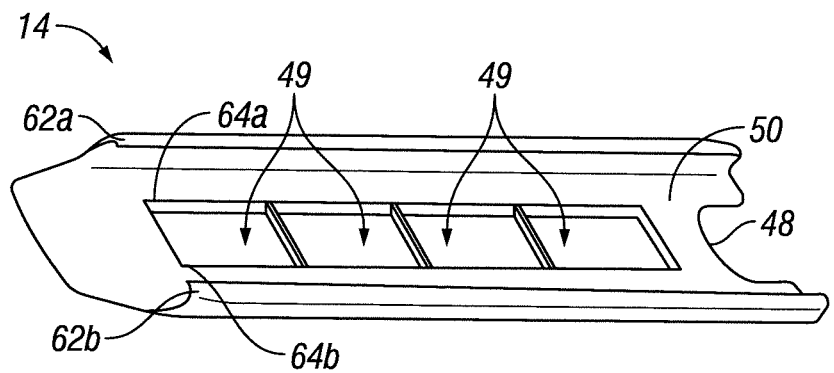
FIG. 8 is a perspective view of an embodiment of a grind plate in accordance with the present disclosure.

With reference to FIGS. 2-8, exemplary embodiments of a deck assembly will now be described. Deck assembly 10 comprises a deck 12 and a grind plate 14 that is attachable to the deck 12. Deck 12 is an elongate member that has a front end 18, a rear end 35, a top surface 36, a bottom surface 38, and two opposite side surfaces 40a, 40b. The deck 12 is the component of the scooter assembly 1 on which the rider stands during use, and may include certain design features to allow the rider better balance and control of the scooter assembly with his feet. For example, as best seen in FIG. 5, a central portion 42 of the deck 12 may be flat while two opposite lateral portions 44a, 44b may be disposed at a slight angle to central portion 42. This configuration allows the rider to balance by locating his feet on the central portion 42 and turn or engage in certain tricks by moving one or both feet onto a lateral portion 44. The deck 12 may be extruded to be substantially hollow, thereby providing strength and support for the rider while reducing the weight of the scooter assembly.

An infill space 47 may be defined in the top surface 36 of the deck 12, and an infill piece 45 may be included and disposed within the infill space 47 to fill up the space. Interlocking connection of the infill piece 45 with the infill space 47 is facilitated by infill dovetail features 51. Toward the back end of the scooter assembly 1, brake 8 is connected to the deck assembly 10 by being disposed in the infill space 47 and secured with infill piece 45. Toward the front end of the scooter assembly 1, neck 16 is connected to the deck assembly 10 by being disposed in the infill space 47 and secured with infill piece 45.

Figure 9:
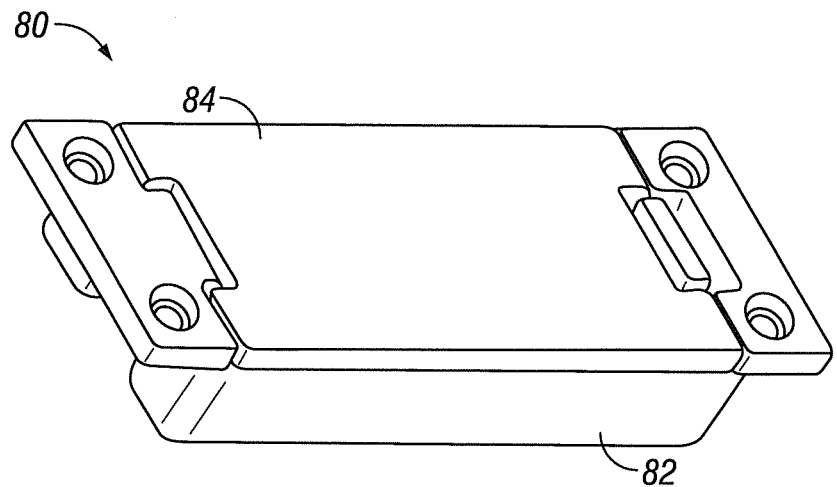
FIG. 9 is a perspective view of an embodiment of a storage compartment for a deck assembly in accordance with the present disclosure.

Exemplary embodiments of a deck 12 may include a storage compartment 80 that the rider can use to store keys, money, etc. In particular, storage compartment 80 is useful for storing specialized tools such as an Allen wrench that are needed to manipulate various fasteners to assemble or adjust components of the scooter assembly. An exemplary embodiment of a storage compartment 80 is shown in FIG. 9. The storage compartment 80 may have a housing 82 and a movable door 84 for accessing the interior of the housing 82. A cutout 43 for the storage compartment may be defined in the top surface 36 of the deck 12 to house the storage compartment 80. A piece of foam may be provided and dye cut to the shape of the wrench, and the wrench placed therein so it does not move around during use of the scooter. The storage compartment 80 may be covered by infill piece 45 or may be exposed by a cutout in the infill piece 45.

An exemplary embodiment of a grind plate 14 includes a front end 46, a rear end 48, a top surface that acts as a mating surface 50, and a bottom surface that acts as a grinding surface 52. The grinding surface 52 may include features to facilitate certain scooter tricks such as grinding on outdoor fixtures like curbs or handrails. In an exemplary embodiment, the grinding surface 52 is substantially V-shaped, or a center portion 54 of the grinding surface 52 defines a longitudinal V-shaped cutout 53. This V-shape 53 is located at or near the center of gravity of the scooter to help the rider stay centered on the outdoor fixtures when grinding, and in particular, to help the rider find the center when landing on a rail. In exemplary embodiments, the grind plate 14 is made of a plastic material, but other materials may be used such as metals, metal alloys, carbon fiber, and other composite materials. In another embodiment shown in FIG. 8, hollowed out boxes 49 provide further weight reduction of the grind plate 14.

Figure 3:
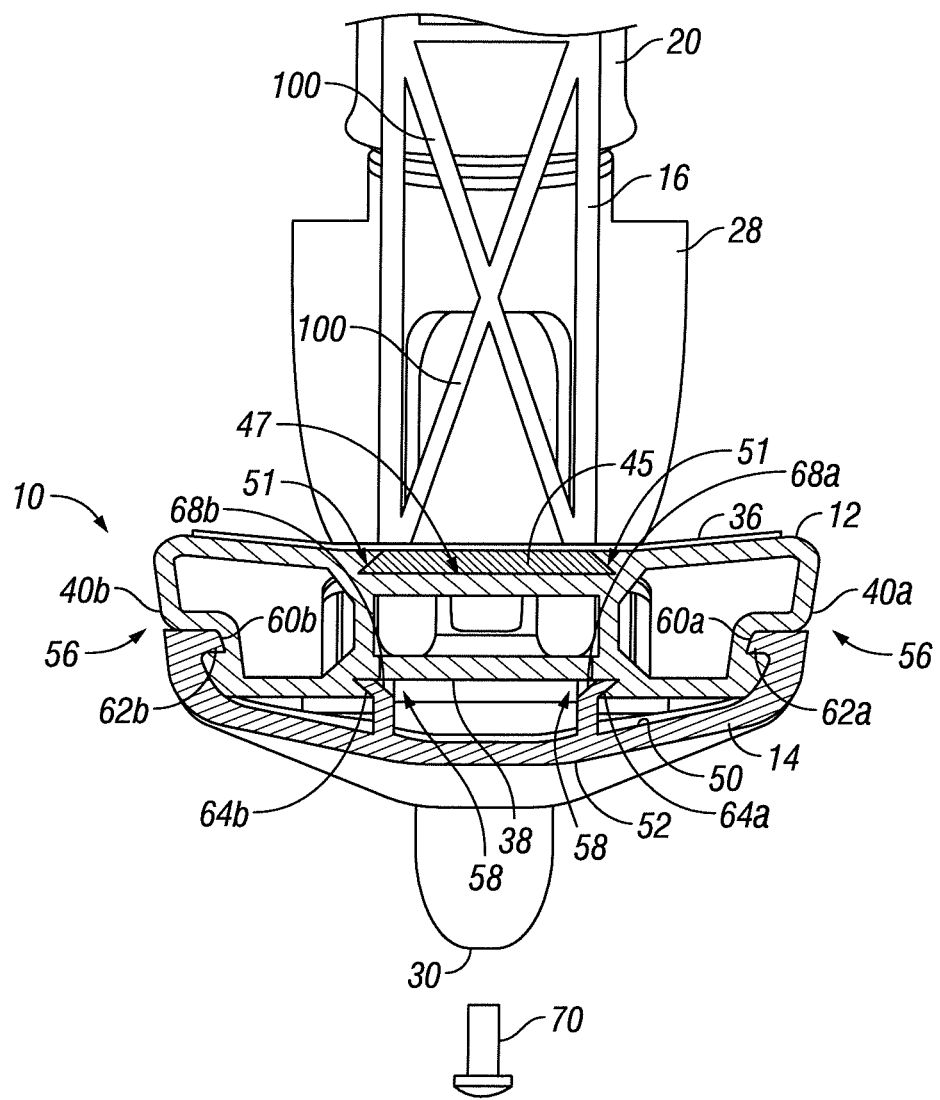
FIG. 3 is a cut away cross-sectional view of an embodiment of a deck assembly in accordance with the present disclosure.
Figure 4:
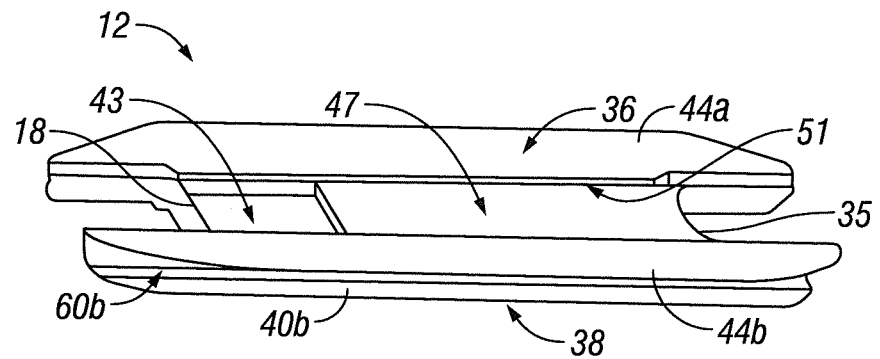
FIG. 4 is a perspective view of an embodiment of a deck in accordance with the present disclosure.

Grind plate 14 is designed to mate with the deck 12. More particularly, the mating surface 50 of the grind plate 14 mates with the bottom surface 38 of the deck 12. As best seen in FIGS. 2 and 3, grind plate 14 and deck 12 have complementary locking features. Any locking features can be used so long as they provide a secure connection between the mating surface 50 of the grind plate 14 and the bottom surface 38 of the deck 12 and facilitate slidable attachment and detachment. In exemplary embodiments, the complementary locking features of the deck 12 and grind plate 14 comprise interlocking dovetail slide-in features 56 and 58. Dovetail slide-in features 56 include flanges 62a, 62b that are extensions of the mating surface 50 of the grind plate 14 and longitudinal recesses 60a, 60b defined in the side surfaces 40a, 40b of the deck 12 and sized to slidably receive flanges 62a, 62b. Dovetail slide-in features 58 include angled extensions 64a, 64b that extend from a center portion 66 of the mating surface 50 of the grind plate 14 and complementary angled channels 68a, 68b defined in a center portion of the bottom surface 38 of deck 12 to slidably receive the angled extensions 64a, 64b.

In operation, the rider attaches grind plate 14 to deck 12 by first lining it up behind the rear end 35 of the deck 12 such that the mating surface 50 of the grind plate 14 and the bottom surface 38 of the deck 12 are facing in opposite directions. More particularly, the rider lines up the grind plate 14 and deck 12 so that flanges 62a, 62b of the grind plate 14 line up with longitudinal recesses 60a, 60b of the deck 12 and angled extensions 64a, 64b line up with angled channels 68a, 68b. As shown in FIG. 2, grind plate 14 is then slid forward until its front end 46 is even with the front end 33 of the deck 12 so the complementary locking features of the deck 12 and grind plate 14 slide into full engagement. Specifically, the interlocking dovetail slide-in features 56 and 58 interlock and connect the grind plate 14 to the deck 12 when longitudinal recesses 60a, 60b of the side surfaces 40a, 40b of the deck 12 fully receive flanges 62a, 62b and angled channels 68a, 68b defined in a center portion 60 of the bottom surface 38 of deck 12 fully receive angled extensions 64a, 64b of the mating surface 50 of the grind plate 14. Additional fasteners such as screws 70 may be used to provide a more secure connection.

It should be noted that this design optimizes the mating connection of the deck assembly by providing two different types of slidable connection mechanisms, namely, two different dovetail slide-in features 56 and 58. The first dovetail slide-in feature comprises flanges 62a, 62b of the grind plate 14 received in longitudinal recesses 60a, 60b of the side surfaces 40a, 40b of the deck 12. The second dovetail slide-in feature comprises angled extensions 64a, 64b of the mating surface 50 of the grind plate 14 received in angled channels 68a, 68b defined in a center portion of the bottom surface 38 of deck 12.

One of the important advantages of disclosed embodiments of the deck assembly 10 is that when grind plate 14 is attached to the deck 12 the grind plate 14 covers the bottom surface 38 of the deck 12 and at least a portion of each side surface 40a, 40b of the deck 12. This wrap around coverage extending around the bottom edges to the sides 40 of the deck 12 provides extra protection of the deck against wear and tear from use. Another advantage is the relative ease of attachment, as described above, and ease of detachment. Removal of the grind plate 14 is a simple procedure in which the rider slides the grind plate 14 in the reverse direction to disengage the interlocking dovetail slide-in features 56 and 58.

Figure 10A:
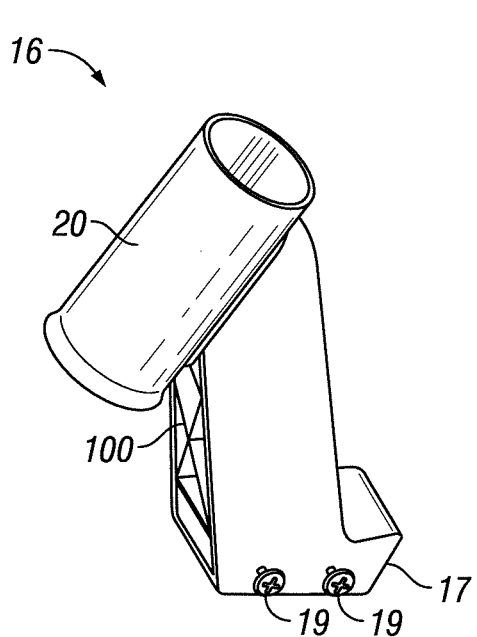
FIG. 10A is a perspective view of an embodiment of a neck for a scooter assembly in accordance with the present disclosure.
Figure 10B:
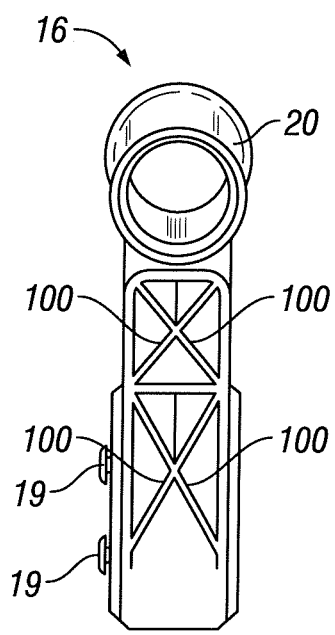
FIG. 10B is a rear view of the neck of FIG. 10A.

Referring to FIGS. 10A-10B, an exemplary embodiment of a scooter neck 16 includes one or more cross beams 100 to strengthen the neck component. The neck 16 could have a variety of cross beam configurations, including a single cross beam, a pair of cross beams, or a more complex network of cross beams. In an exemplary embodiment, two pairs of cross beams 100 form two X-shapes. The cross beams 100 impart additional strength to the neck 16 while minimizing the weight of the neck component. The cross beams also diffuse pressure and stress on the neck 16. These are important advantages because the neck of a freestyle scooter is a point of stress and frequent breakage, but adding weight to the scooter can compromise maneuverability. In exemplary embodiments, the head tube 20 is integrally formed with the neck 16. In exemplary embodiments, neck 16 is an extruded, one-piece component having high tolerances. The neck 16 also has a base 17 with fastening projections 19 to fixedly attach it to the front end 18 of the deck 12. Attachment of the neck 16 to the deck assembly 10 via the infill space 47 and infill piece 45 as described above is advantageous in that it eliminates the need for screws or other fasteners that would take a lot of stress.

Figure 11:
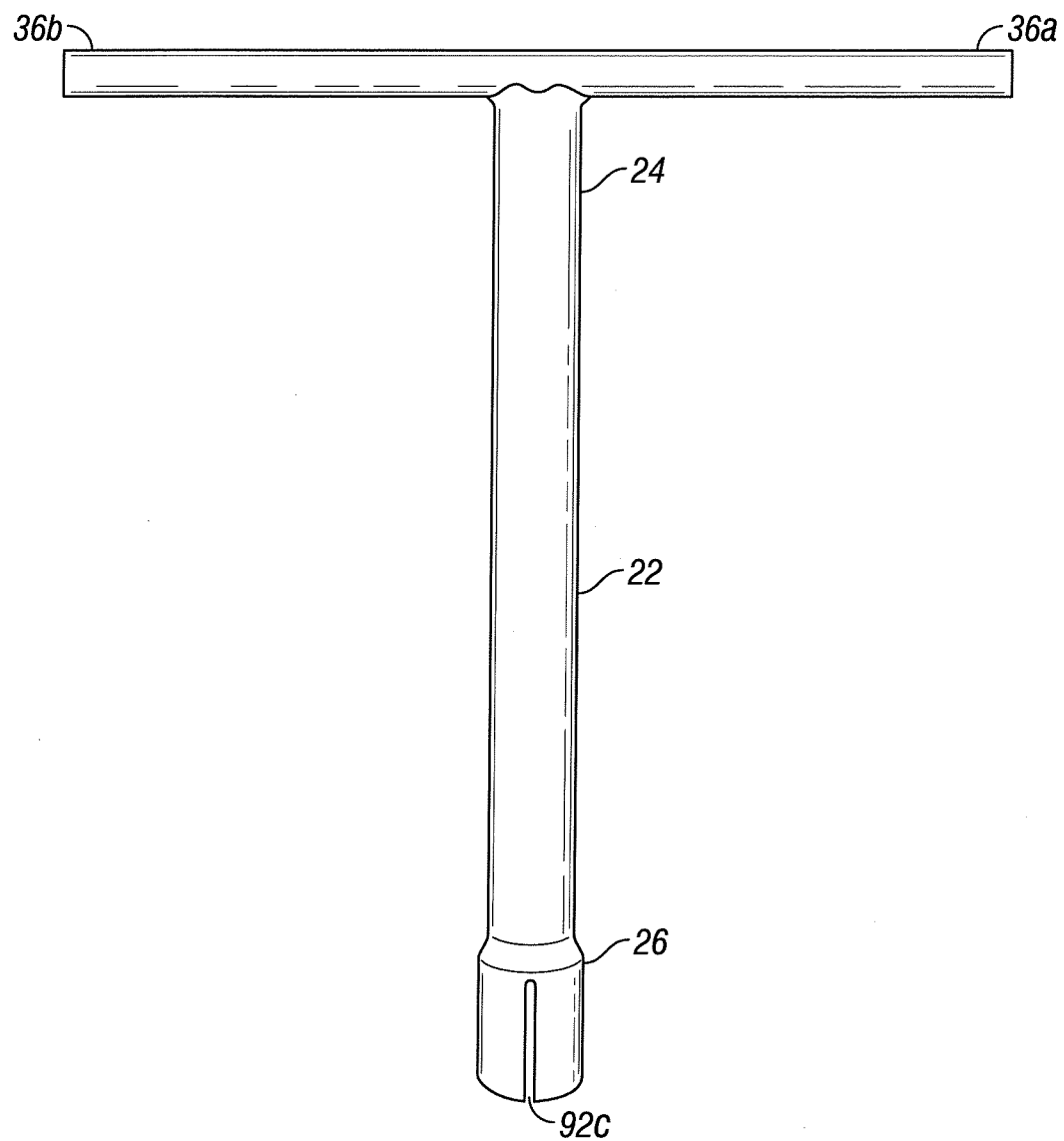
FIG. 11 is a rear view of a steer tube for a scooter assembly in accordance with the present disclosure.
Figure 12:
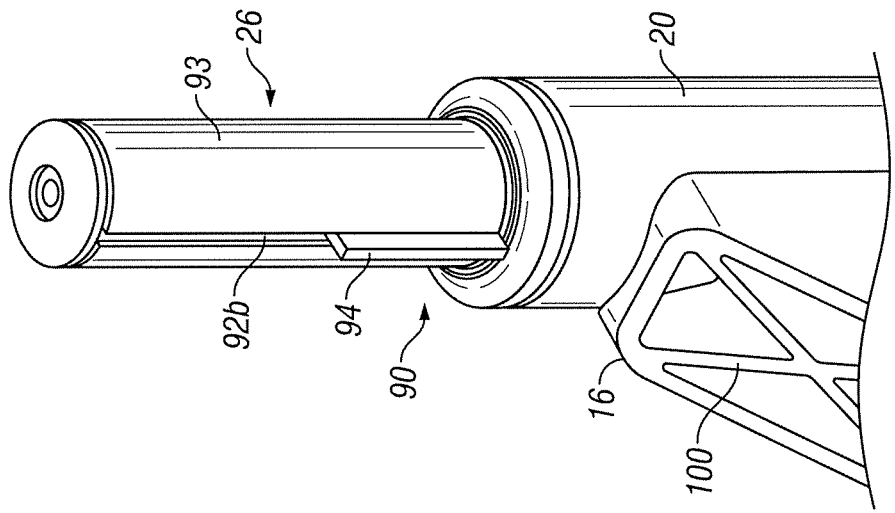
FIG. 12 is a perspective view of an embodiment of an anti-torque system in accordance with the present disclosure.
Figure 13:
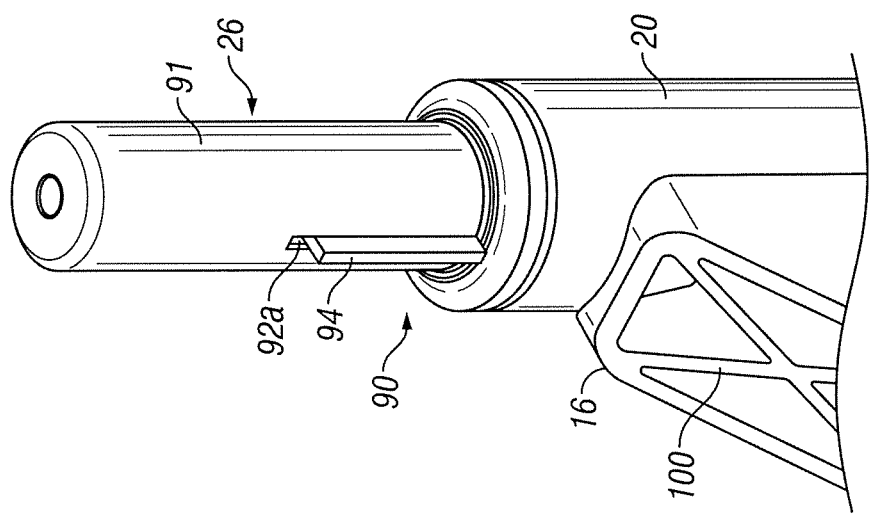
FIG. 13 is a perspective view of an embodiment of an anti-torque system in accordance with the present disclosure.
Figure 15:
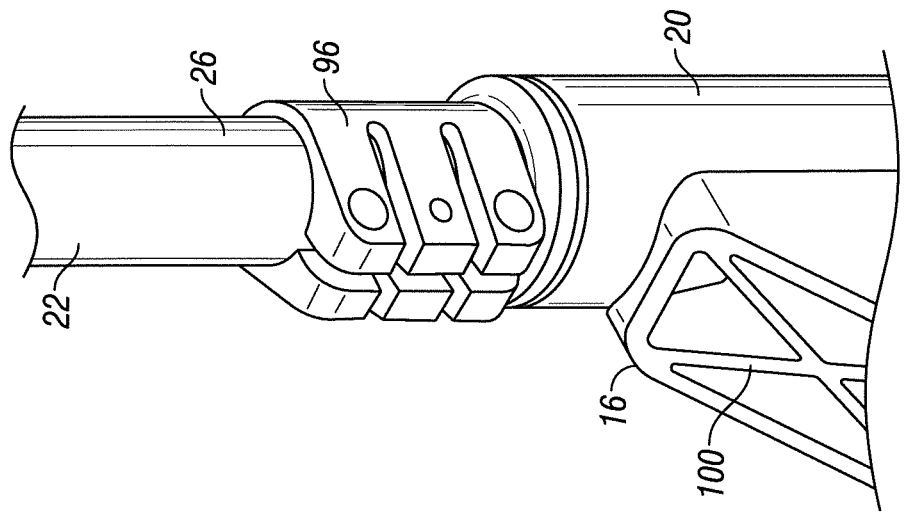
FIG. 15 is a perspective view of an embodiment of a clamp for an anti-torque system in accordance with the present disclosure.
Figure 14:
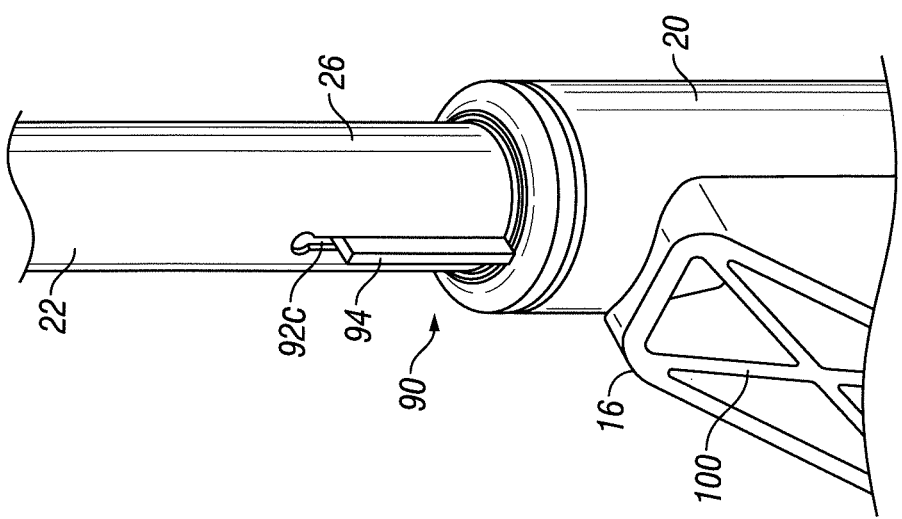
FIG. 14 is a perspective view of an embodiment of an anti-torque system in accordance with the present disclosure.

Another feature that adds strength to exemplary embodiments of scooter assembly 1 is a steer tube 22 that is a butted tube member having varying wall thickness. More particularly, as shown in FIG. 11, the bottom portion 26 of the butted steer tube 22 has a greater wall thickness than the top portion 24 of the butted steer tube 22. The thicker wall at or near the bottom portion 26 of the butted steer tube 22 provides additional strength near the attachment point of the steer tube 22 to the deck 12, which is typically an area of high stress that often is the point of breakage in freestyle scooters.

There are different configurations that could provide this advantage. For example, the steer tube could have different portions of discrete wall thicknesses such that the tube wall near the top portion 24 of the steer tube 22 may have a first thickness, and the tube wall near the bottom portion 26 of the steer tube 22 may have a second thickness greater than the first thickness. In addition, a middle portion of the steer tube wall could have a third intermediate thickness. Alternatively, instead of discrete tube portions of different wall thicknesses, the steer tube 22 could gradually increase in thickness as it descends from relatively thin walls at or near the top portion 24 of the steer tube 22 to relatively thick walls at or near the bottom portion 26 of the steer tube 22. Exemplary wall thicknesses of the bottom portion 26 of the steer tube 22 are about 4-7 mm. Exemplary wall thicknesses of the top portion 24 of the steer tube 22 are about 1-3 mm.

Turning now to FIGS. 12-15, it can be seen that exemplary embodiments of a scooter assembly 1 comprise an anti-torque system 90 to prevent play in the steer tube 22 and front fork 28 from creating misalignment problems wherein the handlebar assembly 34 and front wheel 30 get out of alignment. Embodiments of an anti-torque system 90 include a linear slot 92 defined in front fork 28 and an accompanying key 94 designed to fit into the slot 92. The key 94 can be any substantially flat component sized to fit at least partially into slot 92, and in exemplary embodiments is a flat rectangular metal tongue.

In exemplary embodiments, slot 92 is actually defined by three different slots for insertion of the key 94. More particularly, the inner shaft 91 of front fork 28 defines slot 92a, the outer surface of the stem 93 of the front fork 28 defines slot 92b, and the bottom portion 26 of steer tube 22 defines slot 92c. As best seen FIG. 14, in a fully assembled steer tube 22, slots 92a, 92b and 92c line up so that an inserted key 94 extends through each slot 92a, 92b, 92c. In operation, the rider inserts key 94 into slot 92, and the fully inserted key 94 prevents the front fork 28 from accidental torqueing, i.e., moving independently of the steer tube 22, thereby maintaining alignment of the steer tube 22, the front fork 28, and the front wheel 30. A clamp assembly 96 may be coupled to the steer tube 22 such that it covers the slot 92 and key 94. The clamp 96 secures and protects the anti-torque system 90 and provides further assurance against misalignment problems.

Thus, it is seen that scooter assemblies and scooter deck assemblies are provided. It should be understood that any of the foregoing configurations and specialized components or may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A deck assembly for a scooter, comprising:
a deck having a top surface, a bottom surface, a front end, a rear end, and two side surfaces;
a grind plate having a front end, a rear end, a mating surface, and a grinding surface;
the grind plate being slidably attachable to the deck by sliding the grind plate in a forward direction from the rear end of the deck to the front end of the deck such that the mating surface of the grind plate mates with the bottom surface of the deck, and the bottom surface of the deck and at least a portion of each side surface of the deck are covered by the grind plate.

2. The deck assembly of claim 1 wherein the grind plate and the deck comprise interlocking dovetail slide-in features.

3. The deck assembly of claim 1 wherein the grinding surface of the grind plate is substantially V-shaped.

4. The deck assembly of claim 1 wherein the grind plate is made of plastic.

5. The deck assembly of claim 1 wherein the deck defines a storage compartment.

6. A scooter assembly comprising:
a deck having a front end, a rear end, a top surface, a bottom surface, and two side surfaces;
a neck joined to the deck at or near the front end of the deck;
a head tube fixedly attached to the neck;
a steer tube extending through the head tube, the steer tube being an integrally formed butted tube member having a first wall thickness near a bottom portion of the steer tube and a second wall thickness near a top portion of the steer tube, the first wall thickness being greater than the second wall thickness;
a front fork movably coupled to a bottom portion of the steer tube and a front wheel coupled to the front fork;
a fixed position rear wheel coupled to the deck at or near the rear end of the deck; and
a grind plate slidably attachable to the deck by sliding the grind plate in a forward direction from the rear end of the deck to the front end of the deck.

7. The scooter assembly of claim 6 further comprising a handlebar assembly attached to the steer tube at or near a top portion of the steer tube.

8. The scooter assembly of claim 6 further comprising a clamp assembly coupled to the steer tube at or near the bottom portion of the steer tube.

9. The scooter assembly of claim 6 wherein the grind plate has a front end, a rear end, a mating surface, and a grinding surface; and
wherein the mating surface of the grind plate mates with the bottom surface of the deck, and the bottom surface of the deck and at least a portion of each side surface of the deck are covered by the grind plate.

10. The scooter assembly of claim 6 wherein the neck comprises one or more cross beams.

11. A scooter assembly comprising:
a deck having a front end, a rear end, a top surface, a bottom surface, and two side surfaces;
a neck joined to the deck at or near the front end of the deck;
a head tube fixedly attached to the neck; a steer tube extending through the head tube;
a front fork movably coupled to a bottom portion of the steer tube via a stem and a front wheel coupled to the front fork;
a fixed position rear wheel coupled to the rear end of the deck; and
a grind plate having a front end, a rear end, a mating surface, and a grinding surface, the grind plate being slidably attachable to the deck by sliding the grind plate in a forward direction from the rear end of the deck to the front end of the deck.

12. The scooter of claim 11 further comprising a clamp assembly coupled to the steer tube at or near the bottom portion of the steer tube.

13. The scooter assembly of claim 11 further comprising a handlebar assembly attached to the steer tube at or near a top portion of the steer tube.

14. The scooter assembly of claim 11 wherein the neck comprises one or more cross beams.

15. The scooter assembly of claim 11 wherein the steer tube is a butted tube member having a first wall thickness near a bottom portion of the steer tube and a second wall thickness near a top portion of the steer tube, the first wall thickness being greater than the second wall thickness.

16. The scooter assembly of claim 11 wherein the mating surface of the grind plate mates with the bottom surface of the deck, and the bottom surface of the deck and at least a portion of each side surface of the deck are covered by the grind plate.

17. The scooter assembly of claim 16 wherein the grind plate and the deck comprise interlocking dovetail slide-in features.

18. The scooter assembly of claim 16 wherein the grinding surface of the grind plate is substantially V-shaped.

* * * * *